(12) United States Patent
Richey

(10) Patent No.: US 6,922,599 B2
(45) Date of Patent: Jul. 26, 2005

(54) SYSTEM AND METHOD FOR PRODUCING AN ASSEMBLY BY DIRECTLY IMPLEMENTING THREE-DIMENSIONAL COMPUTER-AIDED DESIGN COMPONENT DEFINITIONS

(75) Inventor: Michael C. Richey, Stanwood, WA (US)

(73) Assignee: The Boeing Company, Seattle, WA (US)

(*) Notice: Subject to any disclaimer, the term of this patent is extended or adjusted under 35 U.S.C. 154(b) by 543 days.

(21) Appl. No.: 09/928,583

(22) Filed: Aug. 13, 2001

(65) Prior Publication Data

US 2003/0033041 A1 Feb. 13, 2003

(51) Int. Cl.[7] .................................................. G05B 19/42
(52) U.S. Cl. ................................................ 700/98; 700/97
(58) Field of Search ........................................... 700/98

(56) References Cited

U.S. PATENT DOCUMENTS

| | | | |
|---|---|---|---|
| 2,947,275 A | | 8/1960 | Edmonds |
| 3,633,011 A | | 1/1972 | Bederman et al. |
| 4,835,704 A | | 5/1989 | Eichelberger et al. |
| 4,937,768 A | * | 6/1990 | Carver et al. ............... 703/1 |
| 5,033,014 A | | 7/1991 | Carver et al. |
| 5,243,665 A | * | 9/1993 | Maney et al. ............. 382/152 |
| 5,460,758 A | * | 10/1995 | Langer et al. ............ 264/401 |
| 5,482,409 A | | 1/1996 | Dunning et al. |
| 5,511,147 A | | 4/1996 | Abdel-Malek |
| 5,586,391 A | | 12/1996 | Micale |
| 5,615,483 A | | 4/1997 | Micale et al. |
| 5,796,619 A | | 8/1998 | Wampler |
| 5,848,115 A | * | 12/1998 | Little et al. ................ 378/4 |
| 5,903,459 A | * | 5/1999 | Greenwood et al. ....... 700/110 |
| 5,917,726 A | | 6/1999 | Pryor |
| 5,920,483 A | | 7/1999 | Greenwood et al. |
| 5,949,685 A | | 9/1999 | Greenwood et al. |
| 6,064,759 A | * | 5/2000 | Buckley et al. ............ 382/154 |
| 6,170,157 B1 | | 1/2001 | Munk et al. |

FOREIGN PATENT DOCUMENTS

| | | |
|---|---|---|
| FR | 2 617 306 A1 | 12/1988 |
| WO | WO 82 00906 A1 | 3/1982 |
| WO | WO 93 09482 A1 | 5/1993 |

OTHER PUBLICATIONS

New River Kinematics; *Spatial Analyzer* (visited Aug. 14, 2001) <http://www.kinematics.com/sa.htm>; 10 total selected pages.

(Continued)

*Primary Examiner*—Michael D. Masinick
(74) *Attorney, Agent, or Firm*—Alston & Bird LLP

(57) ABSTRACT

A system for producing an assembly comprising at least one component includes at least one 3D metrology system, a workstation processing element, numerical control apparatus and a flexible work cell. The metrology system maps the components for use by the workstation processing element, which electronically displays three-dimensional authority models representative of the components. The workstation processing element compares the as-built models to an electronic display of three-dimensional authority models of the components, and alters a position of at least one of the at least one actual model and the at least one authority model. The workstation processing element then commands the numerical control apparatus to perform a machine operation on the components based upon the comparison. As the numerical control apparatus performs the machine operation on the components, the workstation processing element dynamically displays the actual models such that the electronic display of the actual models is automatically and repeatedly updated.

21 Claims, 6 Drawing Sheets

OTHER PUBLICATIONS

Verisurf; *Verisurf Products* (visited Jun. 20, 2001) <http://www.verisurf.com/products.htm>; 15 total selected pages.

Solid Solutions, Inc.; *Solid Solutions, Inc. Products Page* (visited May 29, 2001) <http://www.solidinc.com/products.htm>; 8 total selected pages.

Douglas A. Hubler et al.; *Using Real–Time 6D Object Tracking to Assemble Large Aerospace Components* (Summer 2000); *available at* <http://www.kinematics.com/publications/CMSC%206D%20Tracking%20Paper.pdf>; 10 total pages.

Mike Richey and Steve Nichols; *Automation of Tool Routines & Analysis for 3D Measurement Systems*;, Society of Automotive Engineers (SAE) Technical Paper 1999–01–2288 (Jun. 1999); 7 total pages.

* cited by examiner

SYSTEM AND METHOD FOR PRODUCING AN ASSEMBLY BY DIRECTLY IMPLEMENTING THREE-DIMENSIONAL COMPUTER-AIDED DESIGN COMPONENT DEFINITIONS

FIELD OF THE INVENTION

The present invention relates to systems and methods for manufacturing an assembly and, more particularly, relates to systems and methods for manufacturing an assembly utilizing three-dimensional computer-aided design models.

BACKGROUND OF THE INVENTION

In many manufacturing systems today, computers are used throughout the process to aid in the design and manufacturing of components, sub-assemblies and major assemblies. In this regard, computer-aided design (CAD) systems help component designers prepare drawings, specifications, parts lists, and other design-related elements using computer programs that are graphic and calculation intensive. In modem CAD systems, end products are designed by geometrically modeling the component in three-dimensions (3D) with a CAD computer program to obtain a component definition for the components, sub-assemblies and major installations.

Designing and developing complex 3D CAD models for many modem end products is a powerful but expensive and intricate process. In the manufacturing industry, component performance and design constraints are balanced against manufacturing capability and cost. Manufactures expend large amounts of effort and resources balancing these issues. A key product of this enterprise wide effort is the 3D CAD models of the components, sub-assemblies, and major assemblies including their respective predefined dimensional tolerances. The bulk of the manufacturing and assembly process revolves around efficiently achieving the constraints defined in and between CAD models of the components and assemblies.

Currently, modem manufacturers expend a significant percentage of their resources to develop and refine 3D CAD models for each component and assembly. Engineers must then create two-dimensional (2D) drawings to detail, dimension and tolerance component features and assembly configurations. This process defines the 2D Drawing as the configuration control and the "authority for manufacturing". This process generates a significant duplication of effort because a series of 2D perspectives of the components have to be created and, thereafter, the tolerances have to be assigned and detailed on a 2D drawing. Thus, it would be desirable to a develop system that works directly with the nominal 3D CAD models and their tolerances to reduce the development and maintenance of conventional component design.

In many modern manufacturing systems, after a component has been designed, the manufacturing process of the component is defined, typically utilizing a computer-aided manufacturing (CAM) system, which generally includes the processes of tool and fixture design, numerical control (NC) programming, computer-aided process planning and production planning and scheduling. After defining and drafting the product, conventional manufacturing techniques are used for assembling components to produce sub-assemblies and installations. Traditionally this process has relied on fixtured tooling techniques utilizing floor assembly jigs and templates that temporarily fasten sub-assemblies and installations together to locate the components relative to predefined engineering requirements. This traditional tooling concept usually requires at least one primary assembly tool for each sub-assembly produced, and movement of the components from tool to tool for manufacturing operations as they are built up.

While the tooling is intended to accurately reflect the original engineering design of the end product, there are many steps between the original CAD design of the components, sub-assemblies, and major assemblies that comprise the end product and the final manufacture of the tool. It is not unusual that the tool as finally manufactured produces components, sub-assemblies, and major assemblies that are outside of the dimensional tolerances of the original CAD design and, more seriously, the tool can become out of tolerance from typical hard use it receives in the factory. Dimensional variations between the CAD design and the as-produced production components and assembly can be introduced through various means, including:

(1) Nominal product plus or minus CAD tolerances verses as-built components;
(2) Free state verses restrained component condition (i.e., clamped versus unclamped);
(3) Manufacturing process assembly variation; and
(4) High interference fastener induced assembly distortion.

Moreover, dimensional variations caused by temperature changes between the tools, which are typically fabricated from steel, and the production components, which are typically fabricated from aluminum, can produce a tolerance variation. Also, hand drilling of the component on the tool produce holes that are not perfectly round when the drill is presented to the component at a slightly non-perpendicular angle to the component, or when the drill is plunged into the component with a motion that is not perfectly linear. Components can shift out of their intended position when they are riveted in non-round holes, and the non uniform hole-to-rivet interference in a non-round hole lacks the strength and fatigue durability of round holes. The tolerance buildup on the assembly as it is moved from tool to tool can result in significant deviation from the original design dimensions, particularly when the components are located and fastened from the tool, unsystematically introducing manufacturing assembly variance. For example, if the manufacturing assembly sequence is random, the resulting manufacturing process growth will also be random and produce assembly variance.

Because of the disadvantages associated with hard tooling, rigorous quality control techniques are often employed in many modem manufacturing systems. For example, tools and fixtures are inspected periodically to ensure the tools meet required product functionality and configuration requirements, and will continue to produce an acceptable component over time. In this regard, Tool Routine inspections are scheduled inspection events that document variation and are used to adjust tool alignment features (e.g., Plum, Level, and Square CAMS data) on the tool to the original 3-2-1 tolerance settings specified on the tool engineering drawing. The frequency of a tool inspection is based on the historical performance (as measured to CAD nominal) of tool features using 3D data collection systems, such as the laser trackers, video grammetry, and computer-aided theodolites. The measured Cartesian point performance to the nominal CAD model values determines the routine frequency.

While tool routine inspections are an adequate quality control tool, they can require the expenditure of an unnecessarily large amount of resources, both in time and money.

Thus, it would be desirable to provide a system that reduces component deviation from the original design dimensions without requiring a separate conventional tool routine inspection.

SUMMARY OF THE INVENTION

In light of the foregoing background, the present invention provides a system and method for producing an assembly that directly implements the nominal 3D CAD model of the assembly into the manufacturing process and presents a dynamic display of the actual component relative to the 3D CAD model. By integrating the 3D CAD model into the manufacturing process, the system and method of the present invention eliminates the generation of 2D drawings for components and tools as required by conventional manufacturing systems. As such, the system and method of the present invention reduce both the volume of engineering hours on a project and the inertia required for process change, while increasing design and component reliability.

In addition to eliminating the requirement of generating 2D drawings, the system and method of the present invention allow operators on the factory floor to view a display of the actual location of the components against the 3D CAD model of the assembly and each of the components. The system continuously collects measurements from the connected measurement systems and uses the data to show the graphical representation of the modeled component in moving position and orientation. Real-time visualization of the components against the nominal location allows operators to easily make minor adjustments to components and therefore produce assemblies that consistently meet precise functional specifications.

The system and method of the present invention also provide the following advantages over conventional manufacturing systems:

(1) Improved product quality with reduced cycle time and defects;

(2) Reduced design and product quality costs by capturing the manufacturing index plan of the assembly and sequences in a nominal 3D CAD definition that includes the 3D CAD model;

(3) Direct use of the full production component and assembly tolerances as opposed to deriving production assembly tolerances from secondary tooling index features;

(4) Integration of "key characteristics" from the production CAD model into the manufacturing measured plans;

(5) Verification, inspection and rework of assemblies at the tool level with the 3D CAD model;

(6) Capability to provide "as built" component information for use, such as to generate historical standard reports to support improvement processes; and (7) Capability of real time processing of the "as built" component configuration during the manufacturing process allowing downstream customers and suppliers to coordinate to as-produced production components and assemblies as opposed to CAD designs.

According to one embodiment, a system for producing an assembly comprising at least one component includes at least one metrology device, a workstation processing element and a numerical control apparatus. The metrology devices are capable of mapping the at least one component, while the workstation processing element is capable of electronically displaying at least one three-dimensional actual model representative of the as-built components based upon the mapping of the components. Utilizing the nominal 3D CAD model, the workstation processing element is further capable of comparing the actual models to an electronic display of at least one three-dimensional authority model (i.e., authority for manufacturing 3D CAD model). For example, in one embodiment, the actual models comprise at least one actual model data set and the authority models comprise at least one authority data set. And in this embodiment, the workstation processing element is capable of comparing by determining a best fit of the actual models with the authority models from the actual model data sets and the authority model data sets. The workstation processing element is further capable of altering a position of at least one of the actual models and the authority models based upon the comparison such that the actual models and authority models at least partially align.

The numerical control apparatus of the system is capable of performing a machine operation on the components based upon the altered position of at least one of the actual models and the authority models. Additionally, while the numerical control apparatus performs the machine operation, the workstation processing element can dynamically display the actual models in real time. In this regard, the electronic displays of the actual (i.e., as built) models are automatically and repeatedly updated as the machine operation is performed. In one embodiment, the workstation processing element is further capable of automatically and repeatedly comparing the actual models and authority models as the machine operation is performed. And in another embodiment, the workstation processing element is capable of repeatedly transferring data representative of the actual model as the machine operation is performed.

In yet another embodiment, a computer-aided drafting and manufacturing (CAD/CAM) element is capable of designing the authority models of the components based upon at least one authority feature of the components. Additionally, in a further embodiment, the computer-aided drafting and manufacturing element can further design the authority models based upon at least one tolerance. In this embodiment, the metrology device is capable of mapping at least one actual feature of the components. As such, the workstation processing element is capable of altering a position of at least one of the actual models and the authority models based upon the authority features and tolerances and the actual features.

In one embodiment, the metrology devices are capable of mapping at least one component based upon a location and orientation of the components relative to a flexible tool. In this embodiment, the workstation processing element can compare the authority models and the as built based upon the location and orientation of the components. In a further embodiment, the workstation processing element is capable of comparing the authority models and actual models further based upon a temperature of the components and a temperature of a local environment, such as the temperature associated with the components position with respect to the numerical control apparatus.

In another embodiment, the system further includes at least one machine tool, capable of fabricating the components before the metrology elements map the components. In a further embodiment, the workstation processing element is capable of generating at least one numerical control (NC) program from the authority models so that the machine tools can fabricate the components based upon the NC programs.

Therefore, the system and method of the present invention, by directly utilizing nominal 3D CAD models and tolerances of parts, eliminates 2D drawings for parts and tools as required by conventional manufacturing systems. As such, the system and method of the present invention reduce both the volume of engineering hours on a project and the inertia required for process change, while increasing design and part reliability. Additionally, by presenting a dynamic, real-time display of the actual component relative to the 3D CAD definition, the system and method of the present invention allow operators to easily make minor adjustments to components as the part proceeds through the manufacturing process to thereby produce parts that consistently meet precise functional specifications.

BRIEF DESCRIPTION OF THE DRAWINGS

Figure 1:
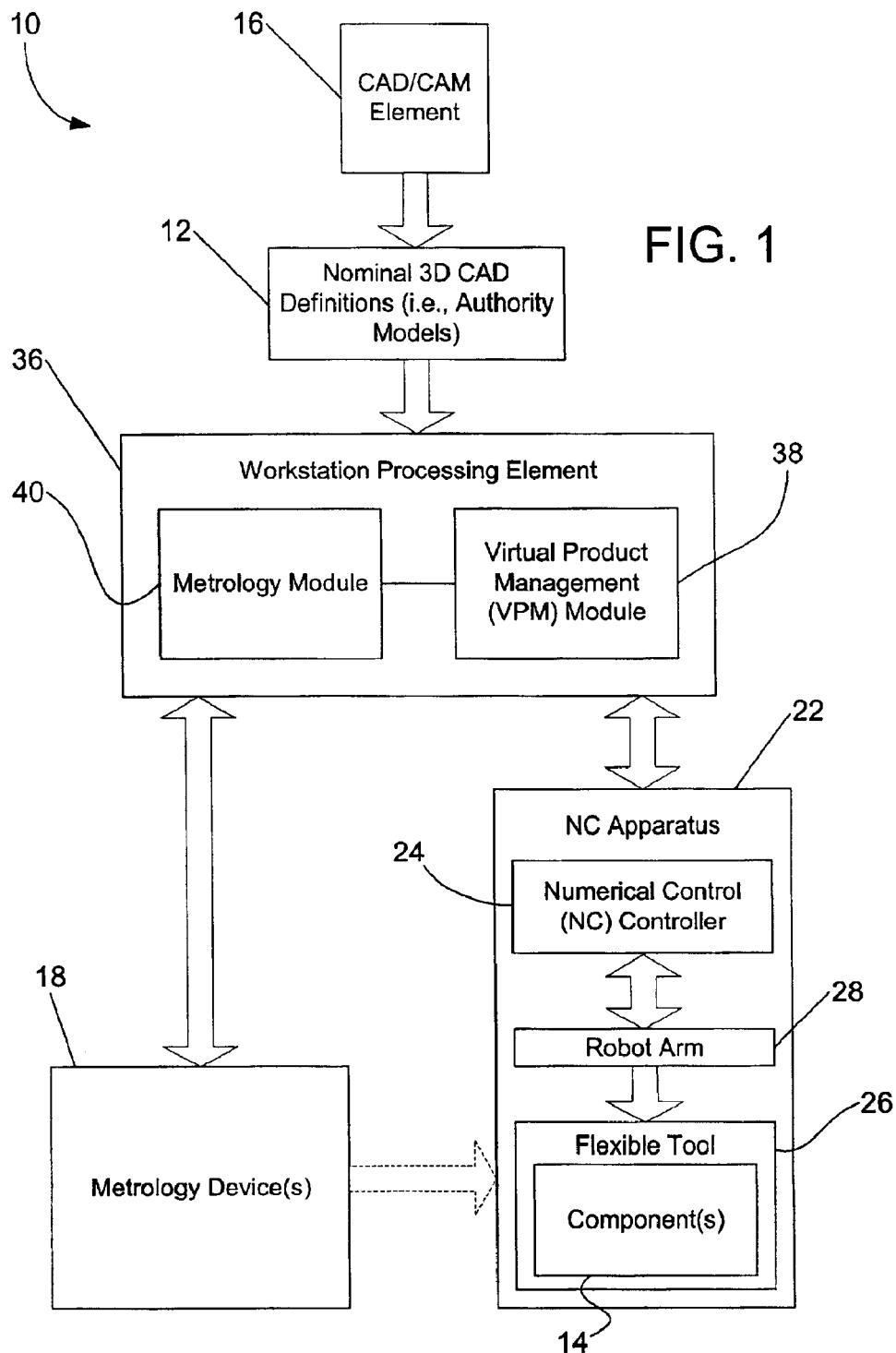
Figure 2:
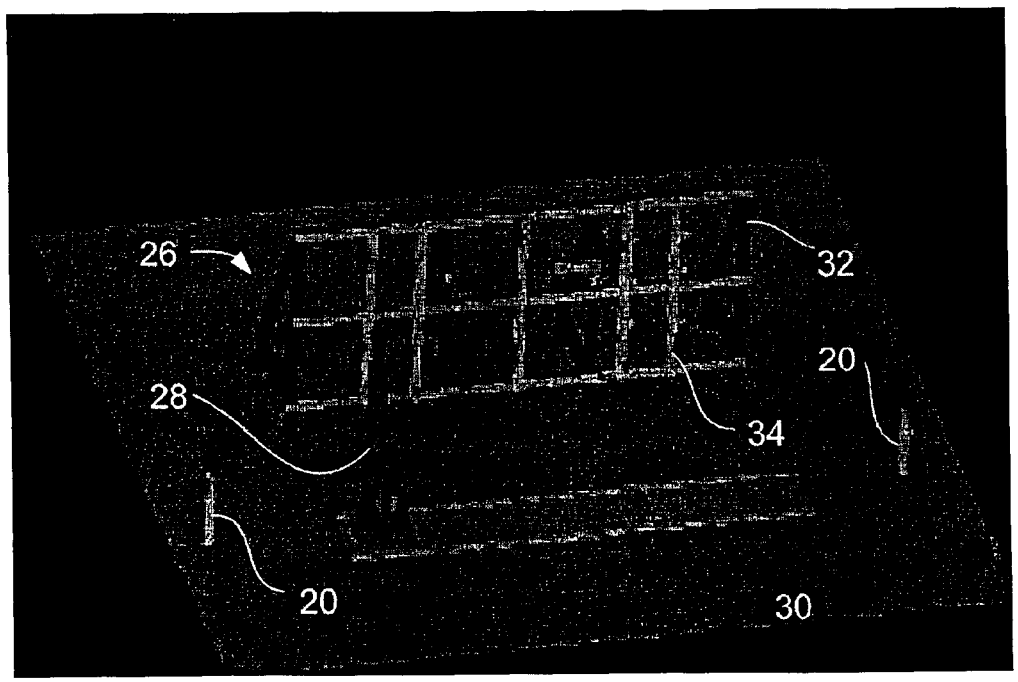
Figure 3A:
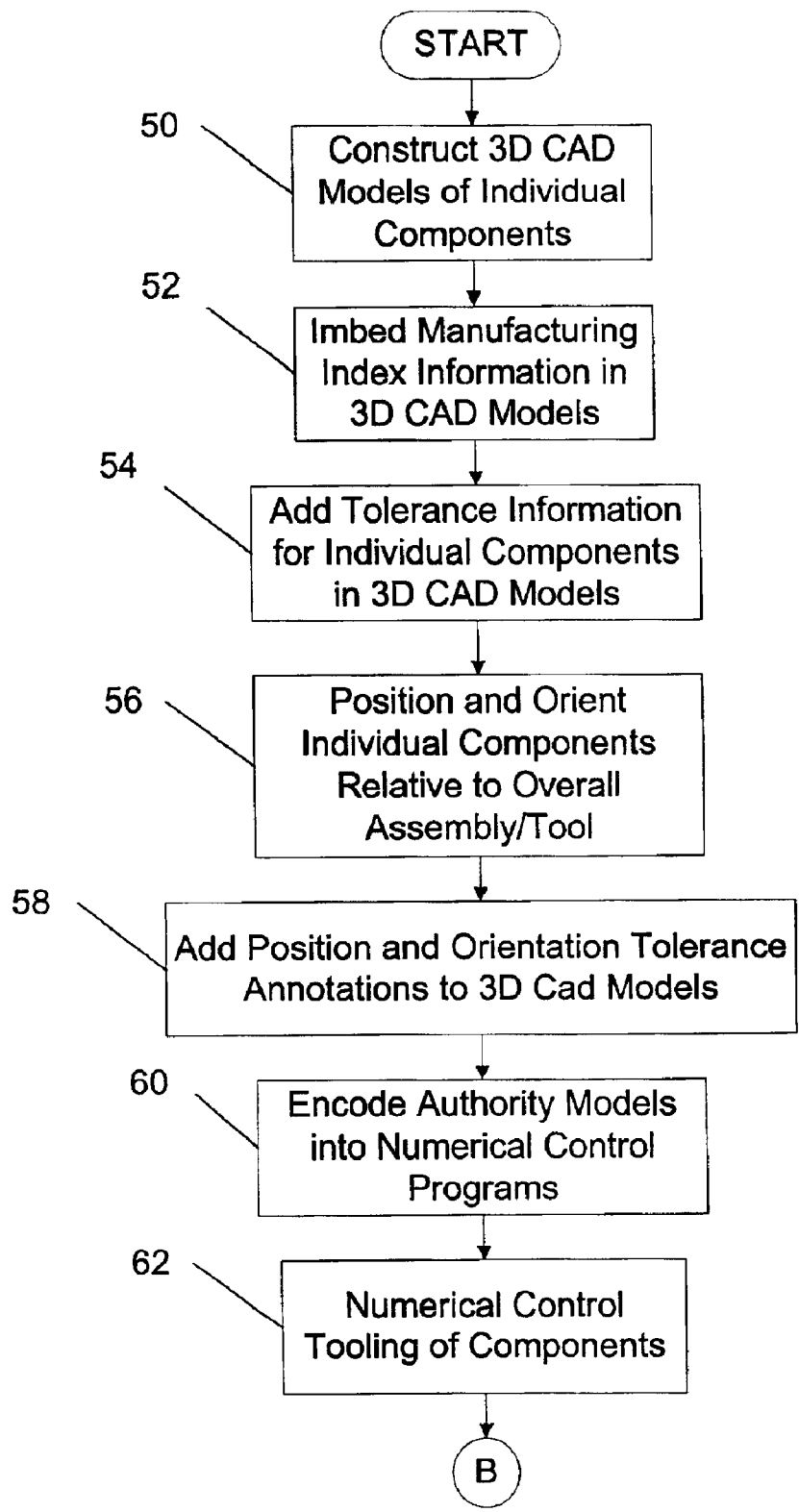
Figure 3B:
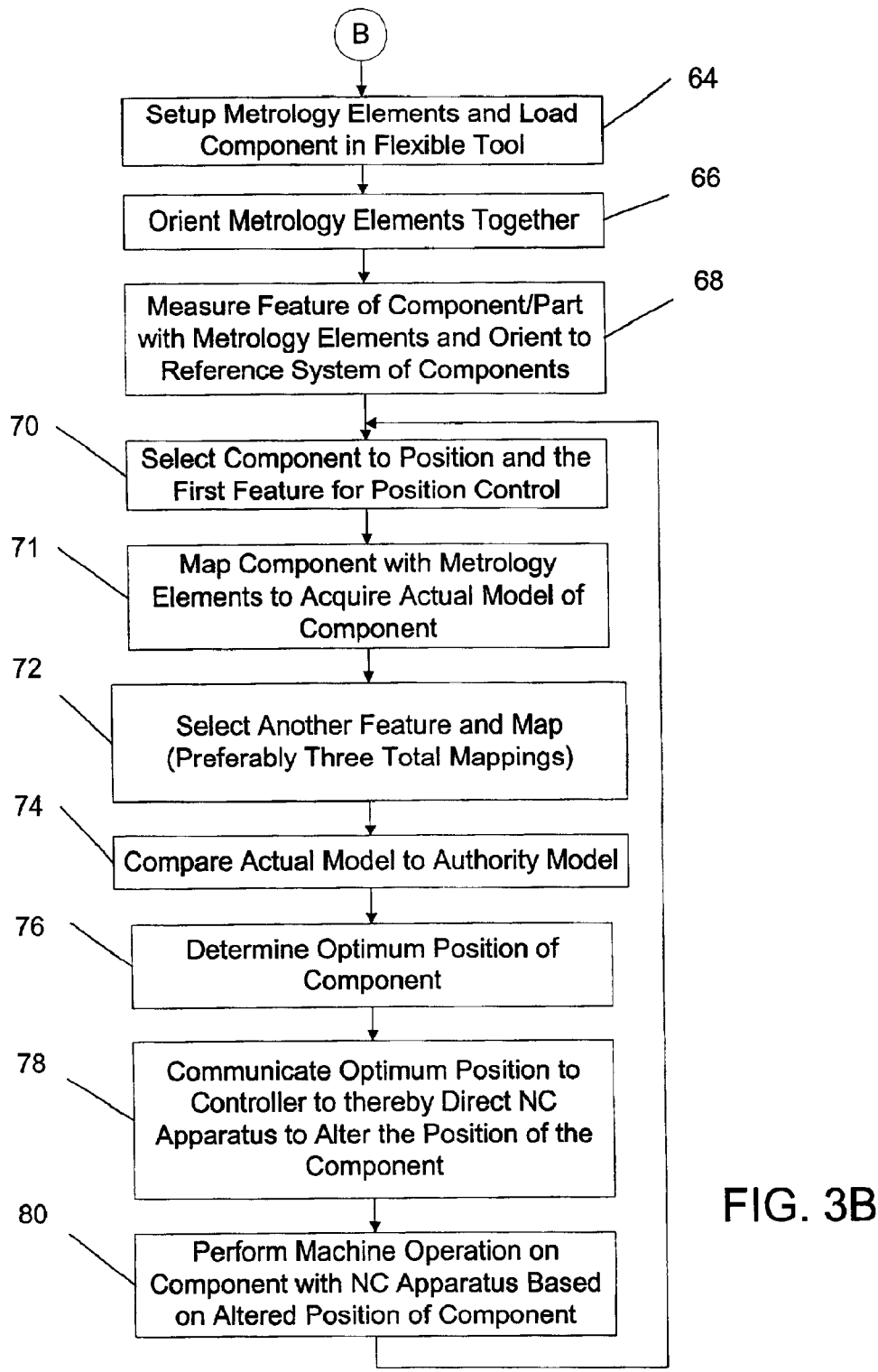
Figure 4:
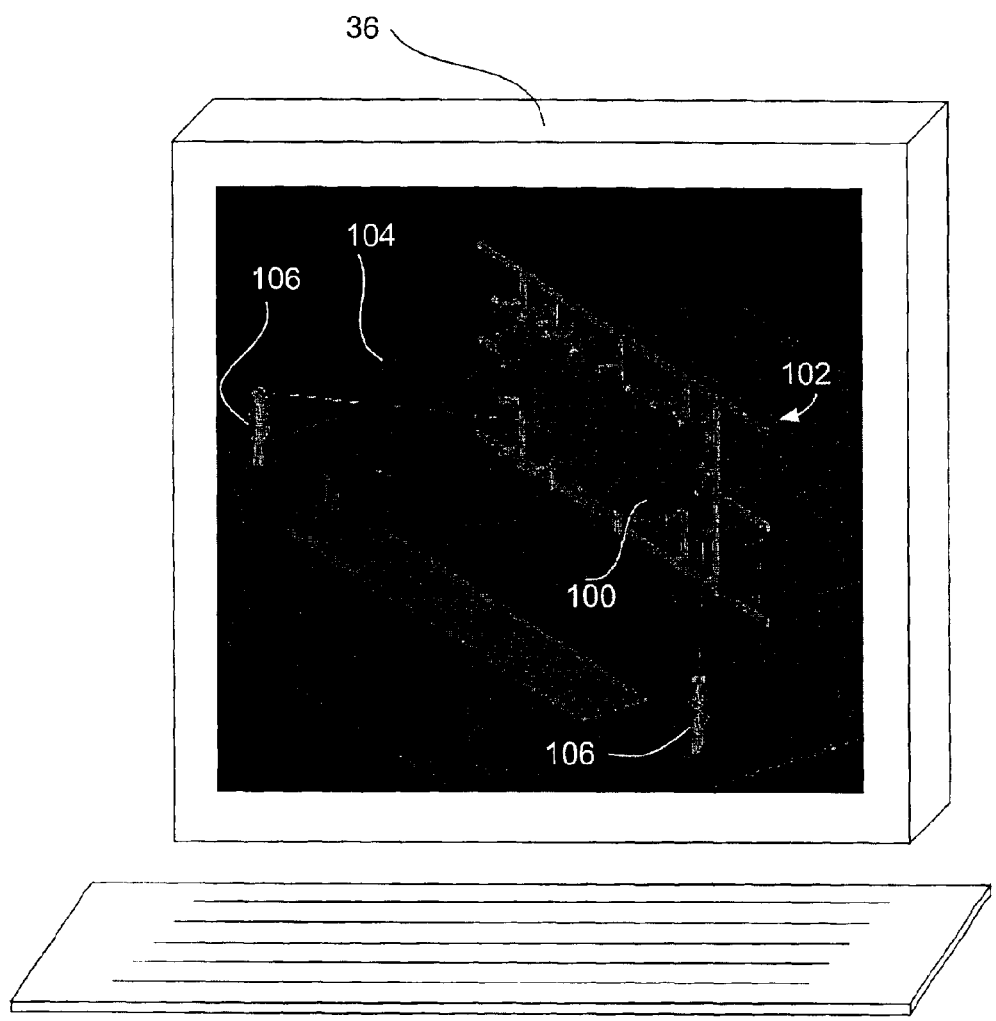
Figure 5:
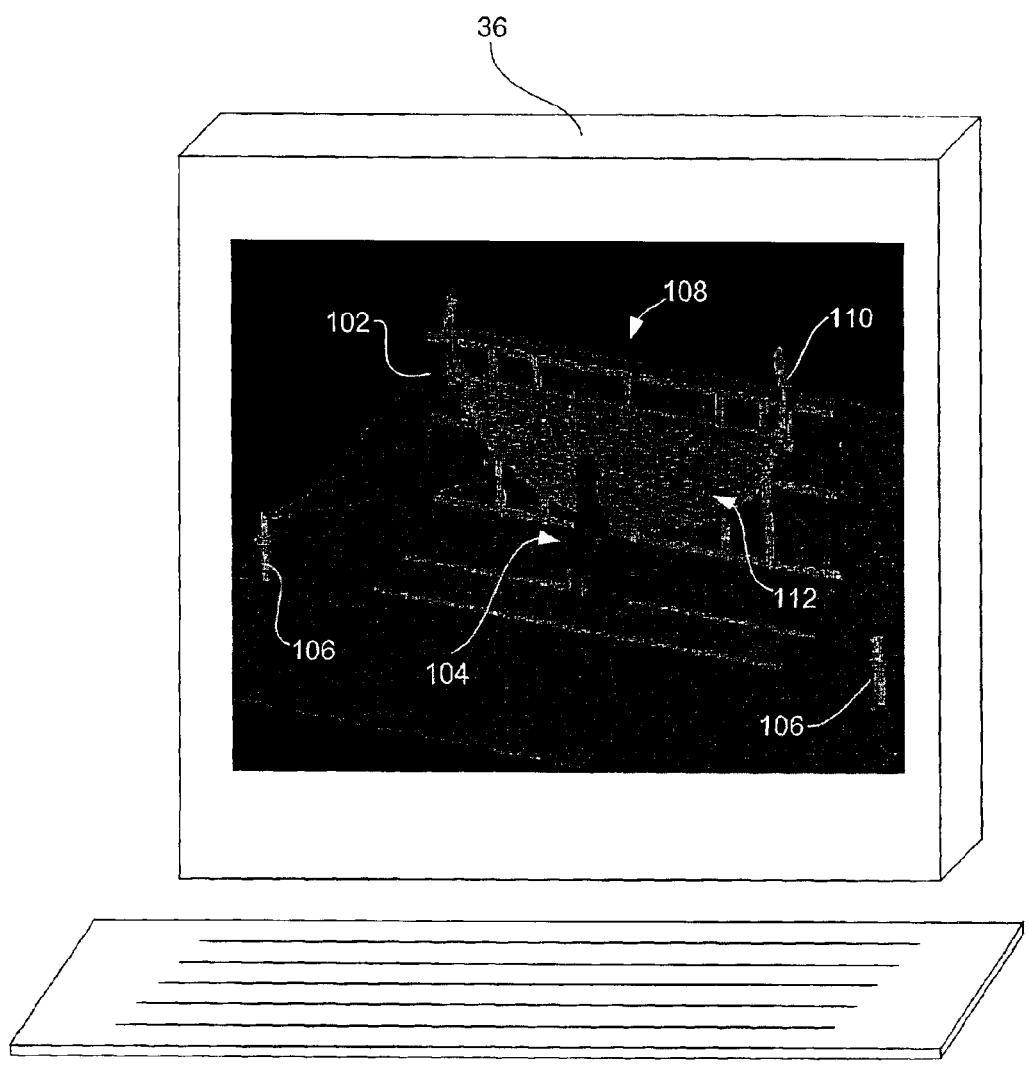

Having thus described the invention in general terms, reference will now be made to the accompanying drawings, which are not necessarily drawn to scale, and wherein:

FIG. 1 is a block diagram illustrating the elements of the system of the present invention according to one embodiment;

FIG. 2 is a schematic diagram illustrating a number of the hardware elements of the present invention, according to one embodiment;

FIGS. 3A and 3B are flow diagrams illustrating one embodiment of a method for producing a part;

FIG. 4 is a schematic diagram illustrating a graphical display of various elements of one embodiment of the system for producing a part, including one component of the part; and FIG. 5 is a schematic diagram of one embodiment of the present invention illustrating a graphical display of one step in the production of an assembly utilizing one embodiment of the system and method of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system 10 of producing an assembly includes nominal 3D CAD definitions 12 (i.e., authority models) of the at least one component 14 that makes up the assembly. In this regard, an assembly can comprise one component, such as in the case of indexing a component, or a plurality of components, such as in the case of securing the components together. The system can operate with authority models created in any of a number of different CAD systems but, in a preferred embodiment, the authority models are created with the CATIA software package distributed by Dassault Systemes S. A. of Suresnes Cedex, France. In this regard, the system can, but need not, include a computer-aided drafting and design (CAD/CAM) element 16 for designing the authority models. The CAD/CAM element can comprise any of a number of different devices, such as a personal computer or other high level processor, operating a software package such as CATIA, a number of Unigraphics Design software systems distributed by Unigraphics Solutions of (UGS) Cypress, Calif., and the Pro/Engineer software package distributed by PTC of Needham, Mass.

The authority models of the components are created to achieve a nominal, design of the part and include the 3D CAD model of the components. While the 3D CAD models can be made up of at least one relationship defined between at least a pair of points on an associated component, preferably the 3D CAD models comprise at least one feature of an associated component (i.e., authority feature), such as at least one point, line, plane, circle, cylinder, surface and curve. The features of the 3D CAD models can comprise any of a number of different formats, including wire frames, exact solids and mock-up solids, as such are known to those skilled in the art.

In addition to the 3D CAD models of the components, the authority models include manufacturing index information and tolerance information for the components and end produced part. In this regard, the manufacturing index information and tolerance information insure the collection of meaningful production features and tolerances. Including the manufacturing index information and the tolerance information in the authority model insures downstream customers and suppliers are coordinating to the same index/build plans and provide the knowledge-based tools to manage and reuse the manufacturing build knowledge. The manufacturing index information could initially be defined at the manufacturing interface and assembly key characteristics drawings level of the component and NC apparatus, with detailed manufacturing and inspection plans integrated into interchangeability and repeatability documentation and manufacturing index plans.

The manufacturing index information includes critical characteristics information associated with the components and assembly. Additionally, the tolerance information can, but need not, include position and orientation tolerances between components defined in the authority models by annotating the relative relationship between the features forming each associated component. The annotation can take any of a number of different forms and can be as simple as a distance envelope or as complex as a Geometric Dimension and Tolerancing callout defined by the American National Standards Institute (ANSI) 14.5 standard. Alternatively, the annotation can take the form of a Functional Dimensioning and Tolerancing (FD&T) scheme, as such is known to those skilled in the art. The FD&T scheme is a unified functional tolerancing scheme used to determine the dimensions and tolerances in part design by providing a methodology of simultaneously integrating the component functional requirements against the manufacturing constraints and metrology conditions.

Referring to FIGS. 1 and 2, the system 10 for producing an assembly comprises both hardware and software elements for utilizing the nominal authority models 12 in the manufacturing process of the assembly. Among the hardware elements, the system includes at least one, but preferably multiple, metrology devices 18 for electronically mapping the components 14 as the assembly proceeds through the manufacturing process. The metrology devices can comprise any of a number of different systems, including contact and non-contact measuring systems such as laser trackers, photogrammetric systems, conventional and portable coordinate measuring machines (CMM's), theodolites, scanners and total stations, devices providing weather station data, component temperature probes, data loggers, electronic calipers, micrometers, flush and trim gauges. For example, as shown in FIG. 2, laser trackers 20, which are a contact measurement system, provide highly accurate static and dynamic linear displacement (distance) and angular (horizontal, vertical) measurements using a retroreflective target (spherically mounted Retroreflector (SMR)), which is held against the object to be measured, e.g., the components. In operation, light reflects off the target to thereby retrace the path of the target and reentering the tracker at the exact position it left. Another measuring system, a photogrammetric system, is a video-based system that utilizes high-resolution video cameras instead of film cameras.

The system 10 also includes a numerical control (NC) apparatus 22, which holds the components in place and performs machine operations on the components. The NC apparatus includes an NC controller 24, a flexible tool 26 and a robot arm 28. The NC controller can comprise any of a number of different static or dynamic controllers known to those skilled in the art. The NC apparatus performs the machine operations on the components utilizing the robot arm and NC controller. The robot arm moves by rotating about a vertical axis and travelling longitudinally along support tracks 30. The robot arm can interface with any of a number of end effectors for performing machining operations on the part, such as a drilling end effector.

In addition to the NC controller 24 and the robot arm 28, the NC apparatus 22 includes the flexible tool 26. As described in the background, conventional manufacturing techniques have relied on fixtured tooling techniques utilizing floor assembly jigs and templates to locate and temporarily fasten detailed structural components together to physically index assemblies thereby locating the components correctly relative to one another. In this regard, traditional tooling techniques usually require at least one primary assembly tool for each sub-assembly produced and each size of each sub-assembly, such as in the production of different size aircraft components for different aircraft models. In contrast, utilizing authority models including 3D CAD models of the components as described below, the system of the present invention can index component to component as opposed to the conventional tool to component, thus eliminating the requirement of temporarily fastening components together with fixtured tooling. As such, the system produces an assembly with a flexible tool, independent of fixtured tooling. The flexible tool consists of a pick-up stand 32 having multiple, adjustable indexing features 34 that continually clamp components of different sizes within defined tolerance zones.

The system 10 further includes a workstation processing element 36 that can comprise any of a number of different devices, including a personal computer or other high level processor. The workstation processing element includes two software modules, a virtual product management (VPM) module 38 and a metrology module 40. It should be understood, however, that although the metrology module and the VPM module are included within the workstation processing element, each module can be included in a separate processor, such as another personal computer or other high level processor, without departing from the spirit and scope of the present invention.

The workstation processing element commands and receives data from the metrology devices 18 representative of the components 14 as the metrology devices map the components locations. Additionally, as described below, the workstation processing element constructs and displays 3D actual models of the components from data received from the metrology devices and thereafter compares the actual models of the components with the authority models of the components (i.e., 3D CAD definitions). The workstation processing element is further capable of altering a position of at least one of the actual models and the authority models based upon the comparison such that the actual models and authority models at least partially align. Based on the comparison, the workstation processing element can command the NC controller 24 to operate the robot arm 28 to thereby perform machine operations on the components as the assembly proceeds through the manufacturing process.

The workstation processing element 36 includes the VPM module 38. The VPM module can comprise any of number different software systems, such as the ENOVIAVPM software system distributed by the ENOVIA Corporation of Charlotte, N.C. The VPM module is capable of managing all of the authority models of the components that make up the assembly. Additionally, the VPM module is capable of integrating 3D CAD models of the tools used to manufacture the assembly together with the authority models of the components to thereby form an overall 3D CAD assembly. In this regard, the VPM module provides an interface to a product structure view of the assembly, which can be stored in the workstation processing element or in a remote repository database. Storage of the overall 3D CAD assembly allows the VPM module to maintain the configuration control for the assembly and provide the foundation to extract the authority models for down stream manufacturing applications. The VPM module will also provide product definition trees for Engineering and Manufacturing which are integral with the authority models.

In addition to the VPM module 38, the workstation processing element 36 includes a metrology module 40, which can comprise any of a number of different software systems such as the Spatial Analyzer software system distributed by New River Kinematics of Pulaski, Va., and the Verisurf product suite distributed by Verisurf of Anaheim, Calif., and the Build-It product suite distributed by Structural Dynamics Research Corporation of Milford, Ohio. The metrology module is capable of interfacing with the metrology devices to thereby map the components. Thereafter, the metrology module is capable of displaying an electronic, actual model representative of the components mapped.

The metrology module additionally receives, from the VPM module 38, the authority models of the components and/or assembly. From the authority models and the actual models, the metrology module can perform a comparison and thereby to alter the position of the actual models and/or the authority models until the actual models are optimized with respect to the authority models such that the actual models and authority models at least partially align. Once the actual models are optimized, the metrology module can command the NC controller 24 to operate the robot arm 28 to thereby perform machine operations on the components as the components proceed through the manufacturing process to produce the assembly.

Referring now to FIGS. 3A and 3B, the method for producing an assembly comprising at least one component 14 begins with the authority models of the components. If the authority models have not previously been created, the authority models can be created with the CAD/CAM element 16. In this regard, 3D CAD models of the individual components are first created based on a nominal design of the assembly to be produced. (Block 50). Manufacturing index information, including critical characteristics information associated with the components, is then imbedded in the 3D CAD models of the components. (Block 52).

Either before or after adding the manufacturing index information, tolerance information associated with the individual components 14 are added to the 3D CAD model of the respective components. (Block 54). In addition to tolerance information defining the components and assembly's relationships, the authority models are preferably annotated with the position and tolerance information, including position and orientation information relating to the overall assembly functionally, such as by the FD&T scheme. To acquire the position and orientation tolerance information, the 3D CAD models of the components are positioned and oriented with respect to the assembly requirements defined by product engineering. Preferably, the 3D CAD models are also positioned and oriented with respect to 3D CAD models of the NC apparatus 22 used to manufacture the assembly. (Blocks 56 and 58). The 3D CAD models of the NC apparatus and metrology elements can be created at the time of creating the 3D CAD models of the components, or previously created 3D CAD models can be provided. Once created, the authority models can be stored, re-called and utilized by the system. (Block 58). In this regard, the final authority models, which are made up of authority data sets, include the 3D CAD models, manufacturing index information, component tolerance information and assembly/tool position and orientation tolerance information.

After either creating or providing the authority models 12 for the components 14, if the actual components have not been fabricated, the workstation processing element can further encode the authority models to thereby generate numerical control (NC) programs for the components. (Block 60). The workstation processing element can encode the authority models utilizing any of a number of different end encoder software systems, including Spatial Analyzer. From the NC programs, at least one machine tool can fabricate the components, as such is known to those skilled in the art. (Block 62).

Either after fabricating the components 14 or providing previously fabricated components, the metrology devices 18 are set up adjacent to the flexible tool, and at least one component of the assembly is loaded secured to the flexible tool. (Block 64). Whereas the metrology devices can be set in any position relative to the flexible tool that allows mapping of the components, in one embodiment the metrology devices are set based upon unobstructed measurement sight paths.

After the metrology devices 18 are set up and the components 14 are secured to the flexible tool, if the metrology devices comprise single point measuring systems, such as laser trackers, the metrology devices must be oriented to the components secured to the flexible tool because position and orientation moving presentation requires at least three metrology devices on three different points on the components. In this regard, three the points should be measured sequentially such that the workstation processing element can make a frame-to-frame comparison. Additionally, the metrology devices can, but need not, be orientated to the flexible tool 26 and robot arm 28 of the NC apparatus 22.

Given that the metrology devices 18 in a typical application will comprise either one tracker, or one PCMM, two Videogrammetry cameras, etc., and that the system 10 will require altering the position of the components 14, the metrology devices should be able to map the step-by-step orientation sequence of the component as the metrology module dynamically tracks the actual models orientation sequence in real-time. In this regard, the metrology module will translate the 3D graphical representation of the component in three dimensions (x, y, z) based on the first of three points on the component. The metrology module uses the second point on the component to set two of the three rotations of the model of the component, and the metrology module uses the third point to set the final rotation or plane of the model of the component.

To orient the metrology devices 18 to the actual models of the components 14, and flexible tool 26 and robot arm 28, measurement heads of the multiple metrology devices are first orientated to each other. (Block 66). Then, the metrology devices measure common points or features of the components and/or assembly that can define the orientation and position of the metrology devices with respect to the reference system of the components and/or assembly. (Block 68). In this regard, the reference system can comprise any of a number of different entity types, including points and geometric entities such as planes, cylinders, lines and parabolas, spine based entities such as surface(s), and a hybrid reference system comprising a combination of the entities of the other reference systems such as hard tooling Enhanced Reference Systems or factory GPS systems. The metrology module 40 of the workstation processing element 36 can then scale the model of the component to compensate for the effects of the flexible tool/robot arm on the components. Additionally, the workstation processing element can scale the model for the effects of the temperature of the components and the temperature of the local environment, such as the temperature associated with the components position with respect to the NC apparatus.

Once the metrology devices 18 are orientated to the components 14, and the flexible tool 26 and NC apparatus 28, a component is selected to position, and a feature (i.e., actual feature), such as a CAD surface or Cartesian point, of the component is selected for position control. (Block 70). As stated with respect to orienting the metrology devices, the system and method is capable of altering the position of the actual models. Therefore, the metrology devices should be able to map the components as the metrology module dynamically models the components in real time. In this regard, the metrology devices preferably map the selected feature as well as the flexible tool 26 and robot arm 28 of the NC apparatus 22 and the metrology devices themselves. (Block 71). The metrology module 40 of the workstation processing element 36 then translates the graphical representation of the components 100 (i.e., actual models), the flexible tool 102 and robot arm 104 of the NC apparatus, and the metrology devices 106, in three dimensions based on the mapped feature, as shown in FIG. 4.

After the first feature of the components 14 is mapped, the metrology devices 18 then map at least two additional features of the components to acquire rotational information relating to the components. (Block 72). The metrology devices map a second feature of the components to set two of the three rotations of the model of the components. And the metrology devices map a third feature to set the final rotation of the model of the component. After the metrology module collects the information from the metrology devices into actual model data sets, which can be graphically displayed in as real time models of the components (along with the flexible tool/robot arm and metrology devices). Similar to the method of orienting the metrology devices to the components, the metrology module can scale the components to compensate for the effects of the flexible tool 26 and robot arm 28 on the components, as well as the effects of temperature and local environment on the components.

After the metrology devices 18 have mapped the components 14, the metrology module 40 of the workstation processing element 36 compares the actual models with the authority models comprising the 3D CAD definitions of the components. (Block 74). To perform the comparison, the VPM module 38 compiles the authority models for the components for use by the metrology module. In addition, the VPM module can compile 3D CAD installation authority models for the flexible tool 26, robot arm 28 and metrology devices. It should be understood at this point that if the authority models, as created, are in a format not understood by the metrology module, the authority models must be reformatted, as such is known to those skilled in the art. For example, the authority models can be formatted into the Standard for the Exchange of Product model data (STEP) format, which provides a universal format for networked companies to share CAD data throughout the entire life product cycle of a product, regardless of the CAD format.

The comparison can comprise any of a number of different methods, including a delta analysis, best fit analysis and a visual comparison. From the comparison, the metrology module 40 determines the optimum position of the components 14, as represented by the actual models, relative to the authority models for the components. (Block 76). In this regard, the optimum position is the position of the components where the actual models align with the authority models as closely as possible. As the metrology module determines the optimum position, the metrology devices 18 continuously and repeatedly map the components in real time, as well as the flexible tool 26, robot arm 28 and/or metrology devices. Thus, the metrology module 40 of the workstation processing element 36 can dynamically display the actual (i.e., 3D CAD as-built) models 100 of the components as the position of the components is altered such that the actual models are automatically and simultaneously updated in real time as the position of the components is altered. Additionally, the metrology module can dynamically display the graphical representations of the flexible tool 102, robot arm 104 and/or metrology devices 106 to thereby construct an overall graphic display of the system as the assembly proceeds through the manufacturing process, as shown in FIG. 5.

Graphically illustrating the components as the position of the components is altered to within the predefined CAD tolerance information (previously included within the authority models), the metrology module can graphically display the authority models against the actual models. And as the actual models are moved within the predefined tolerance, the metrology module can provide an indicator, such as by changing a color of the components or causing the components to blink or otherwise indicate the components are within the defined tolerance.

After the position of the components 14 have been optimized to the authority models, such as by altering the position of the actual models and/or the authority models such that the actual models are as aligned with the authority models as possible, the metrology module communicates the optimum position of the components and/or assembly through end encoders to the NC apparatus 22. (Block 78). Based on the optimum position, the NC apparatus performs a machine operation on the components based on the altered position. (Block 80) As stated above, the robot arm 28 can include any of a number of different end effectors to perform the machine operation, which depend on the assembly manufactured and the stage of manufacturing, including drilling and milling.

In the same manner as in the altering of the position of the actual models and/or authority models, the metrology devices 18 continuously and repeatedly map the components, as well as the flexible tool 26, robot arm 28 and/or metrology devices, as the machine operation is performed. Also, the metrology module 40 of the workstation processing element 36 can dynamically display the actual models 100 of the components in real time as the machine operation is performed. The metrology module can additionally dynamically display 3D graphical representations of the flexible tool 102, robot apparatus 104 and/or metrology devices 106 to thereby repeatedly display and update the overall display of the system.

In addition to dynamically displaying the system parameters as the machine operation is performed, the workstation processing element 36 can utilize the actual, as-built, data for ancillary functions, such as analysis, record generation and/or transmission. For example, the workstation processing element 36 can transfer, to a remote location, the actual data set from which the actual model is derived. In this regard, users at remote locations can acquire data representative of the assembly as it proceeds through the manufacturing process to thereby alter components, sub-assemblies and/or assemblies dependant on the "as built" assembly. Also, the as-built data set can be used, such as by the workstation processing element, to generate reports based on the as built versus authority models. In this regard, root cause analysis can be performed based on the reports to troubleshoot the manufacture of the assembly.

After the NC apparatus has performed the machine operation, the process repeats through each step of the manufacturing process. For example, as shown in FIG. 5, if the process were implemented in the production of a determinate assembly 108, the process could be used to drill each coordinate hole common to the main assembly component 110, and utilize component-to-component indexing of all of the sub-components 112 within the 3D CAD assembly model.

In addition to reducing the requirements for applied fixed tooling, the system and methods of this invention allow a shift in measurement focus from tool to component on partial or non-digitally defined tools and fixtures. The CAD models can be made up of at least one dimension defined between at least a pair of points which comprise Cartesian point coordinates or a physical CAD modeled feature. In this regard the system and method of the present invention can be applied to components and tools that have not, or are not, completely represented in a 3D CAD model comprising features of the components or NC apparatus. In this regard, the CAD models will comprise a series of points, consisting of graphical and optical points made up of Cartesian point coordinates.

Graphical points, whether graphical manufacturing points (GMP) associated with the components or graphical tooling points (GTP) associated with the NC apparatus, are nominal CAD points used in a manner similar to the features of completely represented 3D CAD models of the components. Optical points, on the other hand, consisting of optical manufacturing points (OMP) and optical tooling points (OTP) are physical points located on the components and NC apparatus, respectively. Optical points are measured with the metrology devices and are compared to the graphical points based on an enhanced reference system (ERS) associated with the components as well as the NC apparatus.

In this embodiment, measurement collection from the metrology devices is performed in a manner to utilize single point errors versus CAD features for statistical process control (SPC) analysis (vectors from established GMP's, "x, y, z" coordinate error). As such, measurement collection processes on fixed tooling can be automated by collecting measurement sequences with predefined starting points and collection lengths. Collection of measurement clouds relative to established surface nominal points is preferably accomplished utilizing a collection area routine and averaging error vectors. For more information on this embodiment, see Steve Nichols and Mike Richey, *Automation of Tool Routines & Analysis for 3D Measurement Systems*, AEROSPACE MANUFACTURING TECHNOLOGY CONFERENCE & EXPOSITION, Bellevue, WASH., JUN 8–10, 1999.

The system and method of the present invention thus reduce both the volume of inspection hours on a project and the inertia required for process change, while increasing design and component reliability. Additionally, by presenting a dynamic display of the actual component relative to the 3D CAD definition, the system and method of the present invention allow operators to easily make minor adjustments to components as the assembly proceeds through the manufacturing process to thereby produce assemblies that consistently meet precise functional specifications.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of producing an assembly comprising at least one component, said method comprising:
    mapping a fabricated component and thereafter electronically displaying an electronic three-dimensional actual model representative of the component based upon said mapping;
    comparing the actual model to an electronic display of a three-dimensional authority model;
    altering a position of at least one of the actual model and the authority model based upon said comparing such that the authority model and the actual model at least partially align;
    performing a machine operation on the component based upon said altering the position of at least one of the actual model and the authority model; and
    dynamically displaying the actual model such that the actual model is automatically and repeatedly updated as the position of at least one of the actual model and the authority model is altered and the machine operation is performed.

2. A method according to claim 1 further comprising designing at least one electronic three-dimensional authority model of the component before mapping the component, wherein the authority model is based upon at least one feature of the component.

3. A method according to claim 2, wherein said designing comprises designing an authority model based upon at least one authority feature of the component and at least one attributed tolerance, wherein said mapping comprises mapping at least one actual feature of the component, and wherein said comparing comprises comparing the actual model and the authority model based upon the at least one authority feature and at least one attributed tolerance and the at least one actual feature.

4. A method according to claim 1, wherein the actual model comprises actual model data set, wherein the authority model comprises authority model data set, and wherein said comparing comprises determining a best fit of the actual model with the authority model from the actual model data set and the authority model data set.

5. A method according to claim 1, wherein said mapping comprises mapping the component based upon a location and orientation of the component relative to a flexible tool, wherein said comparing comprises comparing the authority model and the actual model based upon the location and orientation of the component.

6. A method according to claim 5, wherein comparing comprises comparing the authority model and the actual model further based upon a temperature of the component and a temperature of a local environment of the component.

7. A method according to claim 1 further comprising fabricating the component before mapping the component.

8. A method according to claim 7, wherein fabricating the component comprises generating at least one numerical control program from at least one three-dimensional authority model and thereafter machining the component based upon the at least one numerical control program.

9. A method according to claim 1, wherein said comparing further comprises automatically and repeatedly comparing the actual model and the authority model as the machine operation is performed.

10. A method according to claim 1 further comprising repeatedly transferring data representative of the actual model while dynamically displaying the actual model, wherein transferring comprises transferring the data to a remote location.

11. A system for producing an assembly comprising at least one component, said system comprising:
    at least one metrology device capable of mapping a fabricated component;
    a workstation processing element capable of electronically displaying an electronic three-dimensional actual model representative of the component based upon the mapping of the component, wherein said workstation processing element is capable of comparing the actual model to an electronic display of a three-dimensional authority model, wherein said workstation processing element is capable of altering a position of at least one of the actual model and the authority model based upon the comparison such that the authority model and the actual model at least partially align; and
    a numerical control apparatus capable of performing a machine operation on the component based upon the altered position of at least one of the actual model and the authority model,
    wherein said workstation processing element is capable of dynamically displaying the actual model as the workstation processing element alters the position of at least one of the actual model and the authority model and as the numerical control apparatus performs the machine operation such that the electronic display of the actual model is automatically and repeatedly updated as the position is altered and the machine operation is performed.

12. A system according to claim 11 further comprising a computer-aided drafting and manufacturing element capable of designing the authority model of the component based upon at least one feature of the component.

13. A system according to claim 12, wherein said computer-aided drafting and manufacturing element is capable of designing an authority model based upon at least one authority feature of the component and at least one tolerance, wherein said at least one metrology device is capable of mapping at least one actual feature of the component, and wherein said workstation processing element is capable of altering a position of at least one of the actual model and the model based upon the at least one authority feature and the at least one tolerance and the at least one actual feature.

14. A system according to claim 11, wherein the actual model comprises actual model data set, wherein the authority model comprises at least one authority data set, and wherein said workstation processing element is capable of comparing by determining a best fit of the actual model with the authority model from the actual model data set and the authority model data set.

15. A system according to claim 11, wherein said at least one metrology device is capable of mapping the component based upon a location and orientation of the component relative to a flexible tool, wherein said workstation processing element is capable of comparing the authority model and the actual model based upon the location and orientation of the component.

16. A system according to claim 15, wherein said workstation processing element is capable of comparing the authority model and the actual model further based upon a temperature of the component and a temperature of a local environment of the component.

17. A system according to claim 11 further comprising at least one machine tool capable of fabricating the component before said at least one metrology device maps the component.

18. A system according to claim 17, wherein said workstation processing element is further capable of automatically generating at least one numerical control program from the authority model, and wherein said at least one machine tool is capable of fabricating the component based upon the at least one numerical control program.

19. A system according to claim 11, wherein said workstation processing element is further capable of automatically and repeatedly comparing in real time actual model and the authority model as the machine operation is performed.

20. A system according to claim 11, wherein said workstation processing element is capable of repeatedly transferring data representative of the actual model as the numerical control apparatus performs the machine operation.

21. A method of producing an assembly comprising at least one component, said method comprising:

mapping a fabricated component and thereafter electronically displaying an electronic three-dimensional actual model representative of the component based upon said mapping;

comparing the actual model to an electronic display of a three-dimensional authority model;

altering a position of at least one of the actual model and the authority model based upon said comparing such that the authority model and the at least one as-built model at least partially align; and performing a machine operation on the component based upon the altered position of the component, wherein comparing comprises automatically and repeatedly comparing the actual model and the authority model as the machine operation is performed.

* * * * *